Feb. 21, 1928.
W. C. BOOTS
1,659,990
EXPANSIBLE BRACELET
Filed Jan. 29, 1927
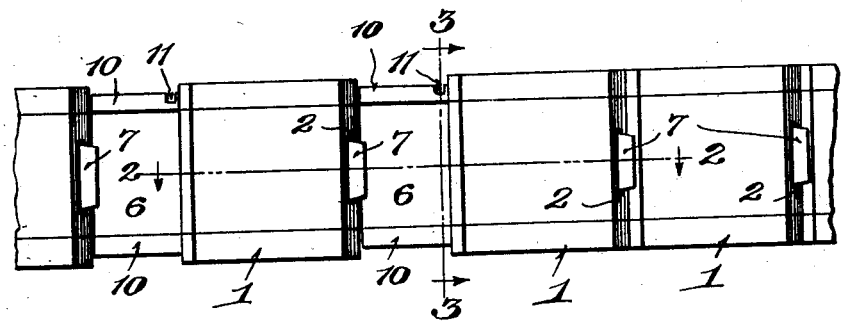
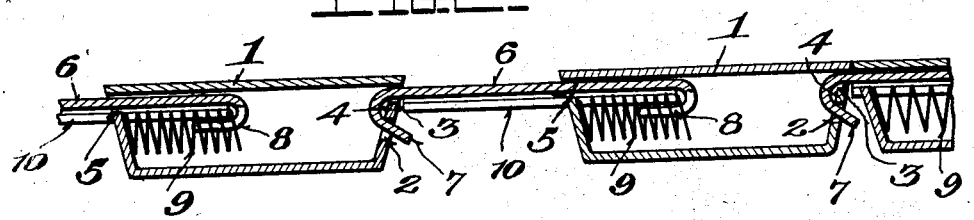
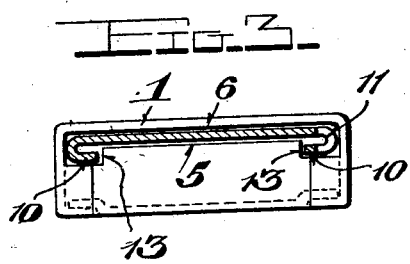 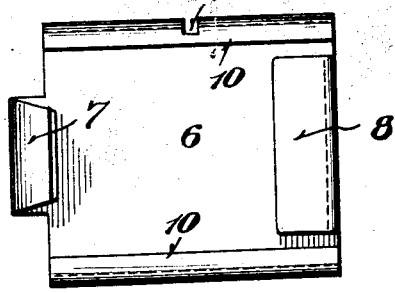
Inventor
William C. Boots
By Joseph A. Miller
Attorney Patented Feb. 21, 1928.

1,659,990

UNITED STATES PATENT OFFICE.

WILLIAM C. BOOTS, OF ATTLEBORO, MASSACHUSETTS, ASSIGNOR TO GUYOT BROTHERS CO. INC., OF ATTLEBORO, MASSACHUSETTS.

EXPANSIBLE BRACELET.

Application filed January 29, 1927. Serial No. 164,503.

This invention relates to new and useful improvements in expansible bracelets, and pertains more particularly to bracelets of this type wherein the links may be disconnected at will for the purpose of removing or adding one or more links for shortening or lengthening the braclet.

The primary object of the invention is to provide an improved form of connector so as to enable the parts to be easily and quickly manipulated in disconnecting the links.

In the drawings:—

Fig. 1 is an inner side elevation of a fragment of a bracelet in accordance with the present invention;

Fig. 2 is a section on line 2—2 of Fig. 1 and

Fig. 3 is a section on line 3—3 of Fig. 1.

Fig. 4 is an inner side elevation of one of the connectors.

In proceeding in accordance with the present invention, boxes 1 are provided which are of hollow formation and which have slots 2 and 3 in one of the ends thereof providing bars 4 therebetween. The opposite ends of the boxes are formed with slots 5 to receive the connectors 6, the latter also passing through the slots 3 of an adjacent box and having hook-shaped ends 7 which embrace the bars 4 and extend through the slots 2. The opposite ends of the connectors are turned inwardly at 8 and extend within coil springs 9. The coil springs tension the connectors and have their opposite ends abutting the ends of the boxes that have the slots 5. As shown in Fig. 4 of the drawings, the side edges of the connectors are turned inwardly or doubled upon themselves, as indicated at 10, and one of the doubled edges is formed with a slot 11. The doubled edges 10 of the connectors not only increase the strength of the latter, but in addition the walls resultant from the notches 11 afford increased contact for engagement with the finger nail of the operator as will now be described.

Referring to Fig. 1 of the drawings, it will be seen that in disconnecting the links or in connecting same, the parts are initially extended to expose a notch 11, so that the operator can place his finger-nail in the notch and thus hold the hook 7 spaced from the adjacent box 1. The boxes may now be turned relative to one another so as to occupy an angular position so as to move the hook 7 out of the slots 2 and 3 and thus disconnect the parts. To connect the parts, the same operation is followed excepting that the hook 7 is threaded through the slots 2 and 3.

From the foregoing it will be seen that the notches 11 provide an effective four-point engagement of the finger nail with the connector, so as to enable the operator to obtain a better and firmer engagement with the connector in holding the latter with the hook 7 out of engagement with the end wall of the adjacent box. At the same time, the doubled parts 10 provide an increased guiding movement for the connectors as is apparent from Fig. 3 wherein the slot 5 has its ends enlarged at 13 so as to provide for the reception of the doubled over parts 10.

It will further be noted that the ends of the doubled over portions 10 adjacent to the hooks 7 provide stops which prevent unlatching of the hooks.

Having thus described my invention what I claim as new and desire to secure by Letters Patent is:—

1. In an expansible bracelet, boxes having slotted ends, and spring tensioned connectors in the boxes having hooks on one end to detachably engage through the slot of an adjacent box, said connectors having their side edges turned over upon themselves to form thickened guides that engage the box sides throughout the lengths of the connectors, one of the turned over side edges being formed with a finger-nail receiving notch.

2. In an expansible bracelet, boxes, spring tensioned connectors in the boxes said connectors having their side edges doubled upon themselves and engaging the box sides throughout the lengths of the connectors and one of the doubled portions formed with a fingernail receiving notch, and means to detachably connect one end of each connector to the adjacent box.

3. In an expansible bracelet, boxes having slotted ends, and spring tensioned connectors for the boxes, the connectors having hooks on one end thereof engageable through the slot at the adjacent end of the adjacent box, said connectors having thickened side edges one of which is formed with a finger-nail receiving notch, the notches being located so that upon outward sliding of the connector the notches will be disposed adjacent to the end of the box in which latter said connector is mounted.

In testimony whereof I have signed my name to this specification.

WILLIAM C. BOOTS.